Figure 1:
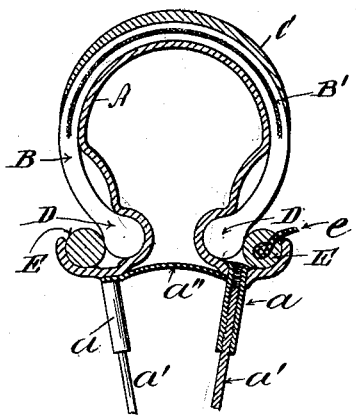

(No Model.) 3 Sheets—Sheet 1.

C. M. LUNGREN.
PNEUMATIC TIRE.

No. 482,182. Patented Sept. 6, 1892.

Witnesses:
D. W. Gardner
Fredric Carragan

Inventor:
Charles M. Lungren (No Model.) 3 Sheets—Sheet 2.
C. M. LUNGREN.
PNEUMATIC TIRE.

No. 482,182. Patented Sept. 6, 1892.

Witnesses:
D. W. Gardner
Frederic Flanagan

Inventor:
Charles M. Lungren (No Model.) 3 Sheets—Sheet 3.

C. M. LUNGREN.
PNEUMATIC TIRE.

No. 482,182. Patented Sept. 6, 1892.

Witnesses:
D. W. Gardner

Inventor:
Charles M. Lungren

UNITED STATES PATENT OFFICE.

CHARLES M. LUNGREN, OF BAYONNE, NEW JERSEY.

PNEUMATIC TIRE.

SPECIFICATION forming part of Letters Patent No. 482,182, dated September 6, 1892.

Application filed September 16, 1891. Serial No. 405,831. (No model.)

*To all whom it may concern:*

Be it known that I, CHARLES M. LUNGREN, a citizen of the United States, and a resident of Bayonne city, in the county of Hudson and State of New Jersey, have invented certain new and useful Improvements in Pneumatic Tires, of which the following is a specification.

This invention relates to the construction of cycle and other vehicle tires of the kind known as "pneumatic"—that is, hollow tires made of flexible material distended to shape by compressing air in the interior.

It has for its object the production of a tire of this kind which will be safer than those heretofore in use and which can be easily applied to the rim of a wheel and readily removed for repairs. Tires of this kind are liable to puncture by sharp articles on a road, and consequently to collapse by the release of the compressed air. In the event of such a collapse the rider is forced to repair the tire before being able to proceed. In my improved construction the wheel-rim is made of such a size and shape that it forms a center on which the punctured tire can collapse and still be serviceable and the damage to the tire be repaired at the leisure of the rider. It is, moreover, attached to the wheel-rim in such a manner that it can be readily removed and the repairs made upon the inner face of the tire, where they should be made to be the most effective.

In the drawings I have shown a number of forms of my improved tire differing from each other in various details of construction.

Figure 2:
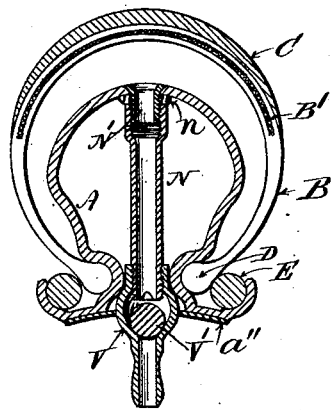
Figure 3:
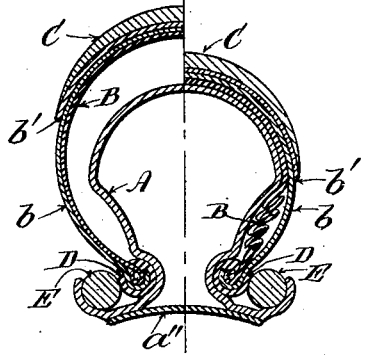
Figure 4:
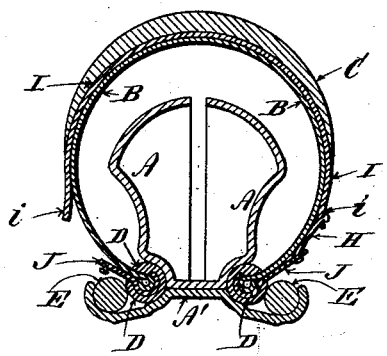
Figure 5:
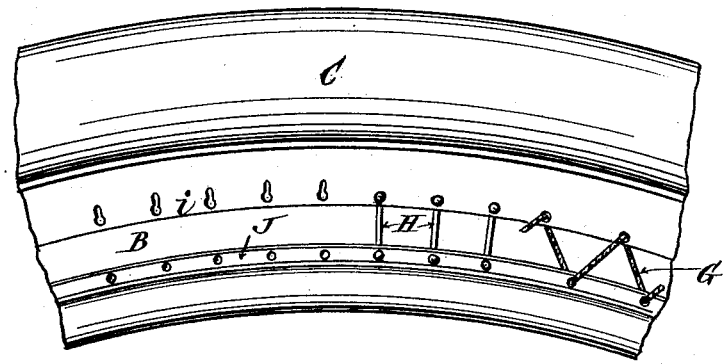
Figure 6:
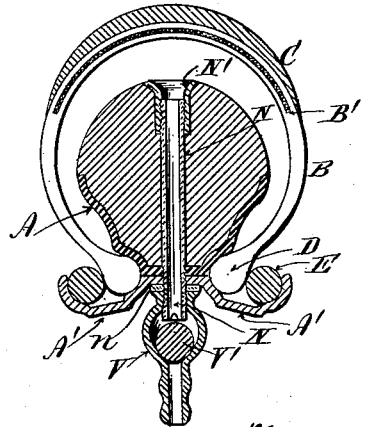
Figure 7:
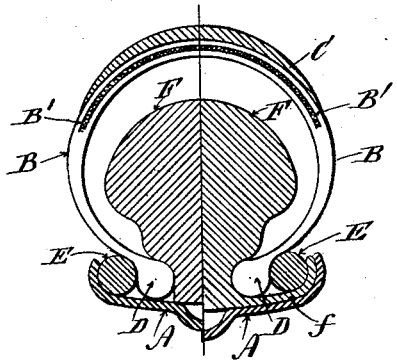
Figure 8:
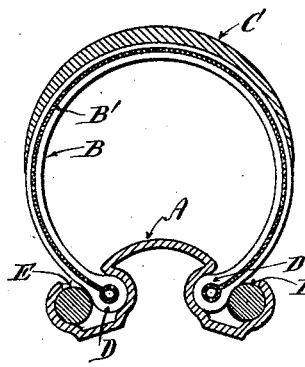

Figure 1 shows one form of the tire before inflation, and Fig. 2 the same tire when inflated. Fig. 3 shows a similar form both when inflated and uninflated, differing in certain details of construction. Fig. 4 shows in cross-section a different form of rim and a form of tire differing from those in the previous figures in certain details of construction, and Fig. 5 shows a side view of these details. Figs. 6 and 7 show forms of wheel-rim combined with rubber to make up the enlarged center, and Fig. 8 shows the described method of attachment applied to a rim without the enlarged center.

Referring to the drawings, the tire shown in Figs. 1 and 2 consists, essentially, of a wheel-rim A, made in tubular form, surrounded by a flexible envelope B, adapted to be expanded by means of compressed air. The wheel-rim A is made of such a size and shape that it forms a support for the envelope B when this latter is not inflated, as shown in Fig. 1. When inflated, the envelope B stands clear of the wheel-rim A, as shown in Fig. 2. If, however, this envelope becomes punctured, and thus loses its compressed air, instead of becoming flabby and useless it simply shrinks down to the rim A and still forms a serviceable tire. The rider, therefore, is not left helpless upon the road or forced to repair his tire before being able to proceed. The tire B, as shown in these two figures, consists of an envelope of rubber having in its outer portion a web of canvas or similar non-expansible material B'. This envelope may be formed entirely of rubber, if desired; but it is preferably provided with the web of non-expansible material in the outer part, as shown. When constructed in this manner, the rubber is not subjected to a tensile strain, this being borne by the canvas, and hence a cut or puncture will have no tendency to spread. The inner part of this envelope, being elastic, expands when the tire is inflated, as shown in Fig. 2, and by its contraction when the air is released brings the tire down to and holds it firmly upon the rim A.

The envelope B may be provided with any suitable reinforcement C upon its outer part to form a tread-surface. It may be attached to the wheel-rim in any desired manner by cement or otherwise; but I prefer to attach it in the manner shown, as it can then be readily removed for repairs and is held more securely in place the greater the air-pressure. This method consists in forming enlarged edges D to the tire B and holding these in place in channels at the edge of the rim A by means of the retaining-bands E. The bands E are preferably made of rubber, in the form of a continuous ring, and are provided with a canvas tab e, by which they can be removed when it is desired to take the tire off. Air may be introduced into the surrounding envelope B through any suitable form of valve. The valve shown in Fig. 2 consists of a globular valve-chamber V, having a neck for the attachment of a charging-pump and screwing onto a nipple N, which nipple screws upon another nipple N', provided with a flaring head, which is passed through the rim from the outside, the two nipples binding the wheel-rim between them, as shown. An elastic washer n serves to make a tight joint. The valve end of the nipple N enters the valve-chamber and is cut away in one or more places to allow air to pass when the ball-valve V' is pressed up against it by the air from the charging-pump. By forming the outwardly-flaring part of the rim A in the manner shown room is provided for the nipples a, holding the spokes a'. When placed in this position they can be readily gotten at for renewal in case of breakage of a spoke or stripping of a thread. A strip of canvas a'' may be used to cover the base-opening of the rim to prevent dirt getting in the interior. The wheel-rim may be rolled from one piece, as shown in Figs. 1, 2, and 3, or it may be formed of two pieces A and A', as shown in Fig. 4, and joined by shrinking A upon A'. In this case the rim A is preferably rolled up, so that the edges abut, but are sufficiently separated to leave a circumferential slit, as shown, to allow of the passage of air to the space between the rim and the tire. The charging-valve is in this case set into the base of the rim where A and A' are joined together.

Instead of forming the center upon which the flexible tire collapses of a metal rim only it may be formed of a combined rim and rubber ring, as shown in Figs. 6 and 7. In the construction shown in Fig. 6 the metal rim is made in two parts A and A', the part A being of gutter shape to receive a solid or tubular rubber ring F, similar to those used in a cushion or solid tire wheel. The air-valve is attached in a similar manner to that shown in Fig. 2, the flared nipple N' being in this case inserted in the crown of the rubber ring and bound in position by the nipple N, as shown. In the construction shown in Fig. 7 the metal rim is of the ordinary gutter form and the thickened edges of the inflatable tire are bound between the outer edges of the rim and the rubber center. The rubber center F is shown in two shapes, that to the right of the figure being provided with a side flap which extends around the thickened edge D and retaining-strip E, while that to the left is without such flap. The air-valve is set in a similar manner to that shown in Fig. 6.

The tire B, instead of being formed of a rubber envelope provided with a web of canvas in its outer part only, may be made throughout of airproof canvas or similar textile fabric, as shown in Fig. 3 in its collapsed condition to the right of the figure and inflated on the left. In this construction B is an inner airproof envelope forming the air-chamber, composed of a textile fabric of linen, cotton, or silk, rendered airproof by a coating of rubber, linseed-oil, or other suitable material. Surrounding this is an envelope of rubber b, attached to it at its outer part, but free from it at the inner part, and covering this at the outer part is a layer of canvas b' to strengthen it and prevent strain coming upon the rubber. The tread-surface C is made the same as in the previous figures. The edges of the canvas envelope B and the rubber envelope b have the enlargement D formed upon them by being rolled together and rubber molded on them. A tire made in this way is non-expansible in its outer part, but elastic at its inner part, the canvas envelope B folding upon itself when collapsed, as shown to the right of the figure, the rubber envelope b by its contraction bringing the tire down to the wheel-rim and holding it in place thereon. When the tire is inflated, the folds of the envelope B are shaken out and the tire expands until it takes the shape shown to the left of the figure, the inner part of the rubber envelope b being then under strong tension. As the only purpose of the rubber envelope b is to draw the tire down to the wheel-rim in case of loss of air, I may dispense with it and substitute an elastic lacing G, such as is shown to the right in Fig. 5. In this case I construct the tire of an airproof non-expansible envelope B and place around its outer part a layer I of canvas or equivalent material, attached to it throughout, except near the edge which is left free, forming a flap i. This flap has eyelets worked through it, through which the lacing can pass. A similar flap J is formed at the base of the tire by a strip of canvas, the inner edge of which is secured to the band D by having the rubber of this band molded around it, the same as it is around the edge of the envelope B. The outer edge of this flap has also eyelets worked in it, so that the two flaps can be readily joined together by the elastic lacing G or the separate elastic strips H. These latter are made with an enlargement on the ends, so that they will be securely held in place when inserted through the eyelets. New strips can be inserted when one gives out without reference to the others, and in this respect they are preferable to either the lacing or the continuous elastic web.

If desired, the elastic element may be dispensed with entirely and the two flaps i and J buttoned together, as shown at the left in Figs. 4 and 5. In this case the lower flap J is provided with buttons and the upper flap with buttonholes, so that the two flaps can be readily joined in case of the collapse of the tire.

For the purpose of racing-machines, in which it is important to have all the parts as light as possible and in which the immediate availability of a punctured tire is unimportant, the tire may be made without the enlarged center, as shown in Fig. 9. In this case the flexible envelope is preferably made with a web of canvas throughout, so as to render it non-expansible. A tire made in the manner described in this specification has the important advantages over those heretofore constructed of not becoming wholly disabled by the escape of its contained air and of being attached to the wheel-rim in such a manner that the inside can be readily gotten at in order to make repairs when punctured. In other forms of tire the air-chamber consists of a closed tube, and repairs can therefore be made upon it on the outside only. In such case the tendency of the air-pressure is to dislodge the patch and reopen the puncture, while in my improved construction the tendency is to hold the patch tightly in place.

What I claim as new, and desire to secure by Letters Patent of the United States, is—

1. The combination, in a vehicle-tire, of a wheel-rim and a surrounding flexible envelope adapted to be distended to shape by compressed air, the wheel-rim partly filling the space inclosed by the inflated envelope and adapted to form a supporting center for this envelope when relieved of its compressed air, substantially as described.

2. The combination, in a vehicle-tire, of a wheel-rim and a surrounding flexible envelope adapted to be distended to shape by compressed air, the envelope being non-expansible at its outer part and expansible at its inner part and the wheel-rim being arranged to form a supporting center for the flexible envelope when it is relieved of its compressed air, substantially as described.

3. The combination, in a vehicle-tire, of a wheel-rim and a surrounding flexible envelope adapted to be distended to shape by compressed air, the wheel-rim consisting of a metal channel provided with a tubular or solid ring of elastic material and arranged to form a supporting center for the flexible envelope when it is relieved of its compressed air, substantially as specified.

4. A vehicle-tire consisting of an envelope or strip of flexible material adapted to be distended to shape by compressed air, said strip or envelope being non-expansible at the part which bears upon the ground and expansible at the part near the wheel-rim, substantially as specified.

5. A vehicle-tire consisting of a strip of flexible material provided with enlarged edges, said strip of material being non-expansible at its central portion and expansible at the parts between this central portion and the enlarged edge, substantially as specified.

6. A vehicle-tire having the following elements in combination: first, a band or strip of flexible material provided with enlarged edges; second, a wheel-rim provided with channels at its edges, said channels being adapted to receive the enlarged edges of the tire, but being large enough to allow these to be freely withdrawn, and, third, retaining rings or strips adapted to hold the enlarged edges of the tire in the rim-channels by acting as wedge-pieces, substantially as specified.

7. In a vehicle-tire, the combination of a wheel-rim provided with a central abutment, a tire consisting of a band or strip of flexible material provided with enlarged edges, and wedge-rings adapted to hold the enlarged edges of the tire in the channels between the central abutment and the edges of the rim, substantially as shown and described.

Signed at New York, in the county of New York and State of New York, this 24th day of August, A. D. 1891.

CHARLES M. LUNGREN.

Witnesses:
   J. B. SABINE,
   ALBERT SHIFFERS.